United States Patent [19]

Ban

[11] 4,305,560
[45] Dec. 15, 1981

[54] ADJUSTABLE LIGHT SUPPORT

[76] Inventor: Shigeru Ban, 1020 S. Barrington Ave., No. 5, Los Angeles, Calif. 90049

[21] Appl. No.: 71,563

[22] Filed: Aug. 31, 1979

[51] Int. Cl.³ ............................................. F16M 13/00
[52] U.S. Cl. ................................................... 248/160
[58] Field of Search ................. 248/80, 81, 105, 106, 248/121, 122, 126, 127, 158, 159, 160, 166, 276, 278, 279, 284, 470, 471, 472

[56] References Cited

U.S. PATENT DOCUMENTS

| | | | |
|---|---|---|---|
| 1,063,220 | 6/1913 | Seamon | 248/278 |
| 1,279,803 | 9/1918 | Watson | 248/160 |
| 1,605,920 | 11/1926 | Burlin | 248/159 |
| 1,894,991 | 1/1933 | Hayes | 248/279 X |
| 3,742,209 | 6/1973 | Williams | 248/278 X |

Primary Examiner—William H. Schultz
Attorney, Agent, or Firm—Koda and Androlia

[57] ABSTRACT

An adjustable light support including a plurality of right angle members and at least one joggled member. The right angle members and the joggled member frictionally and rotatably coupled to form a base, a light socket holder and an adjustable support arm extending between the light socket and the base whereby the configuration of the light support may be adjusted by rotating the right angle and joggled members relative to each other to form aesthetically pleasing shapes.

1 Claim, 4 Drawing Figures

ADJUSTABLE LIGHT SUPPORT

BACKGROUND OF THE INVENTION

1. Field of Invention

This invention relates to adjustable supports and more particularly to flexible supports for lights or lamps.

2. Prior Art

In the prior art there exists adjustable lamp supports. One type of adjustable lamp support is shown in U.S. Pat. No. 599,543. In this patent, a flexible arm is provided to support the light. The flexible arm is made of a plurality of interlocking sections which are rotatable relative to each other. However, while this structure is functional, it is not very aesthetically pleasing and requires a base to which the flexible support must be connected.

To overcome these disadvantages, a light support such as is shown in U.S. Pat. No. 1,279,803 was developed. In this light support, the flexible arm is made from a plurality of segments which decrease in size from the base to the light socket. Each of the interlocking members which make up the flexible arm comprise a conical portion and a ball portion. While this structure is more pleasing aesthetically than that described above, it is still not what would be called an artistic design and still requires a separate base.

SUMMARY OF THE INVENTION

Accordingly, it is a general object of the present invention to provide an adjustable lamp support which is aesthetically pleasing.

It is another object of the present invention to provide an adjustable lamp that does not require a separate base.

It is still another object of the present invention to provide an adjustable lamp support which is made from simple elements and which is low in cost to manufacture.

In keeping with the principles of the present invention, the objects are accomplished by a unique adjustable light support. The adjustable light support includes a plurality of right angle members and at least one joggled member. The right angle members and the joggled member are frictionally and rotatably coupled together to form a lamp base, a light socket holder and an adjustable support arm extending between the light socket holder and the base whereby the configuration of the light support may be adjusted by rotating the right angle and joggled members relative to each other to form aesthetically pleasing structures.

BRIEF DESCRIPTION OF THE DRAWINGS

The above mentioned features and objects of the present invention become more apparent with reference to the following description taken in conjunction with the accompanying drawings wherein like reference numerals denote like elements and and in which.

DETAILED DESCRIPTION OF THE INVENTION

Figure 1:
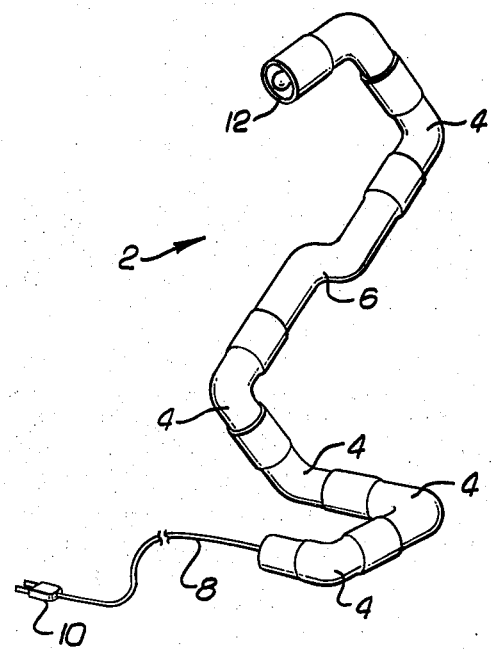
FIG. 1 is a perspective view of an adjustable light support in accordance with the teachings of the present invention.
Figure 2:
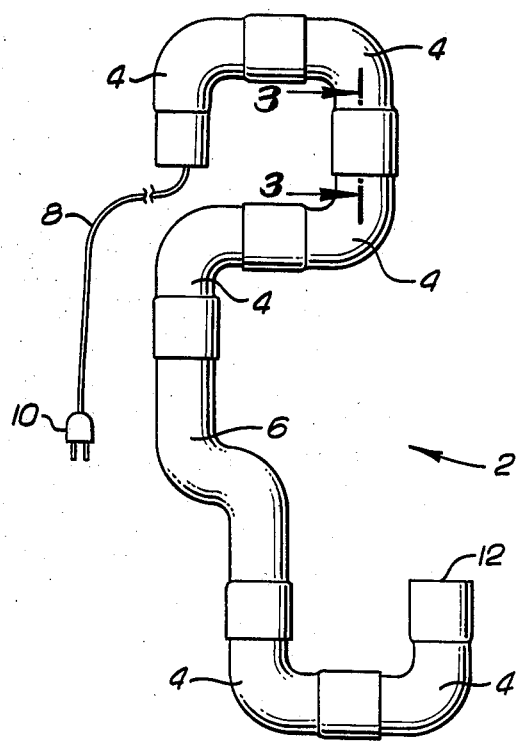
FIG. 2 is a top plan view of an adjustable light support in accordance with the teachings of the present invention wherein all of the members which make up the adjustable light support have been adjusted to lie in a single plane.
Figure 3:
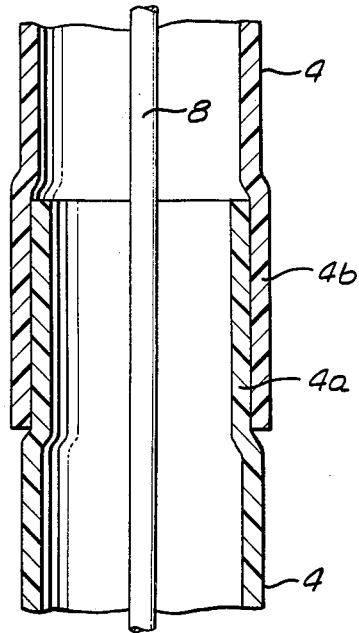
FIG. 3 is an enlarged cross-sectional view of a portion of FIG. 2.

Referring more particularly to the figures, shown in FIGS. 1, 2 and 3 are an adjustable light support in accordance with the teachings of the present invention. Referring to the figures, the adjustable light support 2 includes a plurality of right angle members 4. The adjustable light support 2 further includes at least one joggled member 6. The right angle members 4 and the joggled member 6 form the adjustable light support when coupled together.

The right angle members 4 and the joggled member 6 are all rotatably and frictionally coupled together as is shown in FIG. 3. As is shown in FIG. 3, a small diameter portion of right angle member 4a is inserted within an expanded portion of right angle member 4b. The outside diameter of member 4a is substantially equal to the inside diameter of member 4b. In exactly the same fashion, the joggled member 6 is frictionally and rotatably coupled to a right angle member 4.

In practice, the right angle members 4 and the joggled member 6 can be molded from plastic by any process such as injection molding. Furthermore, the members 4 and 6 are generally tubular and have a preferred circular cross-section. It should be apparent that a square or rectangular cross-section could also be utilized so long as the coupling between the members 4 and 6 is frictional and rotatable. In addition, it would also be possible to design the right angle members 4 and joggled member 6 to present a smooth appearance by providing the member 4a with an end having a reduced diameter so that it would fit within an inside diameter of a member 4b without having to expand out the diameter of the member 4b.

As is readily apparent from examination of the drawings, the illustrated embodiment employs a plurality of generally tubular members each of generally circular cross-section about an internally extending central axis connecting the two ends of the member. In the case of the right angle members 4, the axis in the vicinity of one end is coplanar with, but at right angles to, the axis in the vicinity of its other end. In the case of joggled member 6, its axis in the vicinity of one end is parallel to but displaced to one side of the axis in the vicinity of the other end.

The adjustable light support can be made into a lamp by providing a cord 8, a plug 10 and a light socket in the end 12 of the light support 2. That member of the adjustable light support 2 having the end 12 which contains the light socket is called the light socket holder.

In operation, the first two members 4 and part of the third member 4 from that end of the light support from which the cord 8 extends from forms the base of the lamp. As can be readily seen from FIG. 1 of the drawings, the base portion of the lamp extends in a generally horizontal base plane defined by the axes of said first two right angle members. That portion of the adjustable light support 2 which includes a part of the third member 4, fourth member 4, joggled member 6 and a part of the fifth member 4, as counted from the end of the lamp from which the cord 8 extends, forms an adjustable arm while the end 12 forms the light socket holder. To arrange the shape of the lamp, the individual members 4 and joggled member 6 are rotated relative to each other. The members 4 and 6 are positionally held in place after rotation by the frictional forces between the members 4 and 6 at the coupling points. Accordingly, it is possible to arrange the lamp in a multitude of aesthetically pleasing shapes including but not limited to that illustrated in FIG. 1 wherein the arm portion extends upwardly from the generally horizontal base plane defined by the axes of the first and second members, and that shown in FIG. 2 wherein the axis at the point where the final member of the arm portion is connected to the right angle member 4 forming the light socket holder portion extends in a generally horizontal direction parallel to the base plane defined by the base portion of the lamp.

Furthermore, it should be apparent from the above description that the members 4 and 6 are of quite simple construction and can be easily and cheaply manufactured and a lamp easily assembled therefrom. Furthermore, to provide a proportioned lamp structure it is desirable that the straight portion of both right angle members 4 and the joggled member 6 be from one-third to one-fifth of the total height of the lamp.

Figure 4:
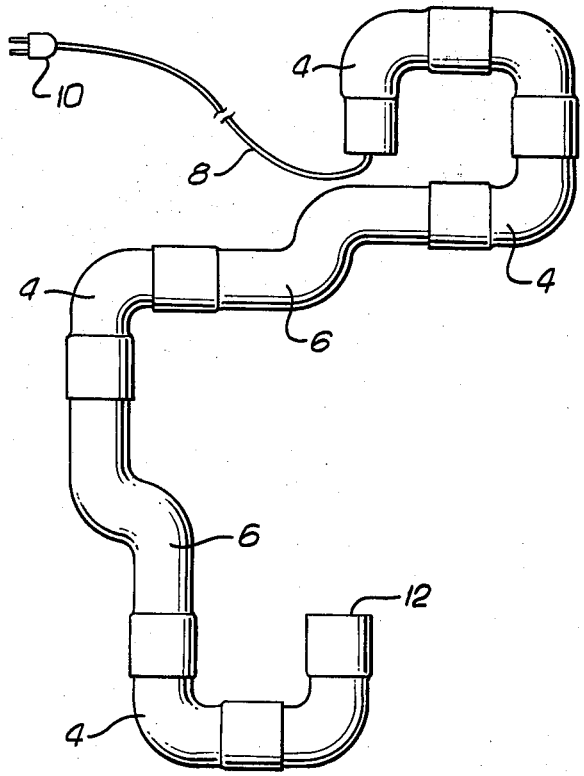
FIG. 4 is a view similar to FIG. 2 illustrating a second configuration of an adjustable light support in accordance with the teachings of the present invention.

Referring to FIG. 4, shown therein is another configuration of an adjustable light support in accordance with the teachings of the present invention. In this configuration two joggled members 6 are utilized. By the addition of the additional joggled member 6 it is possible to increase the number of configurations to which the adjustable light support may be set. It should be apparent that the number of configurations possible could also be increased by adding an additional right angle member 4 to the structure shown in FIG. 2.

It should be further apparent to one skilled in the art that by varying the portions of the light support 2, it would be possible to provide a floor lamp or a table lamp. Also in some applications wherein it is desirable to increase the stability of the lamp, at least one of the members 4, which forms the base for the lamp, can be filled with a heavy material to provide a weighted base. Such materials would include plastic, plaster of paris, lead, etc.

It should be apparent to those skilled in the art that the above described embodiments are merely illustrative of but a few of the many possible specific embodiments which represent the applications of the principles of the present invention. Numeruous and varied other arrangements can be comprised by those skilled in the art without departing from the spirit and scope of the invention.

I claim:
1. An adjustable lamp comprising:
a light socket;
an adjustable light support formed from a plurality of generally tubular members each of generally circular cross-section about an internally extending central axis connecting a first end with a second end, the outside diameter at said first end being substantially equal to the inside diameter at said second end, whereby the second end of one such member may be frictionally rotatably coupled to the first end of another such member with the axis of said one member at its said second end maintained in coaxial alignment with the axis of said another member at its said first end, said plurality of tubular members including at least one joggled member with its axis in the vicinity of its first end parallel to but displaced to one side of the joggled member's axis in the vicinity of its second end, said plurality of tubular members further including a plurality of right angle members each with its axis in the vicinity of its first end coplanar with, but at right angles to, its axis in the vicinity of its second end, said adjustable light support comprising:
a generally horizontal extending base portion formed from a first one of said plurality of right angle members coupled at its second end to the first end of a second one of said members such that the axis of said first member at its first end and the axis of said second member at its second end lie in a common horizontal base plane;
an adjustable arm portion extending upwardly from said base portion, said arm portion comprising a third one of said right angle members adjustably coupled at its first end to the second end of said second member such that the axis of said third member at its second end may extend upwardly from the generally horizontal base plane defined by the axes of said first and second members, said arm portion further comprising said joggled member adjustably coupled at its first end to the second end of said third right angle member such that the axis at the second end of said joggled member may also extend upwardly from said generally horizontal base plane but displaced in an adjustable direction from the axis at the second end of said third right angle member, said adjustable arm portion being terminated by a fourth one of said right angle members adjustably coupled to the remainder of said arm portion such that the axis at the second end of said fourth right angle member may be adjusted such that it extends in a generally horizontal direction above but parallel to said generally horizontal base plane; and
a light socket holder portion formed from a fifth right angle member similar in external appearance to said fourth right angle member and frictionally rotatably coupled at one end to the second end of said fourth right angle member such that the other end of said fifth member may be adjusted to point downwardly, horizontally, or upwardly, said light socket holder being adapted to hold said light socket in the vicinity of said other end;
a cord electrically connected to said light socket with at least a portion of said cord extending inside said adjustable light support; and
a plug electrically connected to said cord for connecting said lamp to a source of electric power.

* * * * *